(12) United States Patent
Mann et al.

(10) Patent No.: US 9,731,854 B2
(45) Date of Patent: Aug. 15, 2017

(54) PRODUCT PACKAGING SYSTEM

(71) Applicant: A M PACKAGING LIMITED, Gainsborough (GB)

(72) Inventors: David Alan Francis Mann, Gainsborough (GB); Lee Neville Wright, Worksop (GB)

(73) Assignee: A M PACKAGING LIMITED, Gainsborough, Lincolnshire (GB)

( * ) Notice: Subject to any disclaimer, the term of this patent is extended or adjusted under 35 U.S.C. 154(b) by 0 days.

(21) Appl. No.: 15/036,904

(22) PCT Filed: Oct. 29, 2014

(86) PCT No.: PCT/GB2014/053207
§ 371 (c)(1),
(2) Date: May 16, 2016

(87) PCT Pub. No.: WO2015/075421
PCT Pub. Date: May 28, 2015

(65) Prior Publication Data
US 2016/0280410 A1    Sep. 29, 2016

(30) Foreign Application Priority Data

Nov. 22, 2013 (GB) .................................. 1320685.9

(51) Int. Cl.
*B65G 47/84* (2006.01)
*B65B 35/54* (2006.01)
(Continued)

(52) U.S. Cl.
CPC .............. *B65B 65/006* (2013.01); *B65B 5/10* (2013.01); *B65B 35/44* (2013.01); *B65B 35/54* (2013.01);
(Continued)

(58) Field of Classification Search
CPC ......... B65B 33/54; B65B 65/006; B65B 5/10; B65B 65/02; B65B 35/44; B65B 57/14;
(Continued)

(56) References Cited

U.S. PATENT DOCUMENTS 6,286,290 B1 *  9/2001  Fluck ...................... B65B 5/106
                                                              198/460.1
9,327,855 B2 *  5/2016  Hurni ...................... B65B 57/16
(Continued)

FOREIGN PATENT DOCUMENTS

DE          19915271 A1      10/2000
DE       102012210329 A1 *  12/2013  ............. B65B 57/16
(Continued)

OTHER PUBLICATIONS

PCT Search Report dated Feb. 9, 2015 of patent Application No. PCT/GB2014/053207 filed Oct. 29, 2014.

*Primary Examiner* — Mark A Deuble
(74) *Attorney, Agent, or Firm* — Maine Cernota & Rardin

(57) ABSTRACT

A product packaging system comprises a plurality of product sources (2, 4, 6) delivering product to a final collating and packaging line (10). The output from each machine is delivered by separate conveying means (8) delivering the products directly into a collating conveyor (20) which in turn delivers the collated products to a packaging line. The collating conveyor comprising an endless conveyor carrying a plurality of compartments, each compartment receiving from said conveying means products to be packaged. The compartments are configured to enable their sizes to be changed, and the endless conveyor comprises a track arranged in a vertical loop and a plurality of product supporting members mounted for movement along the track, each supporting member being driven along the track and controllable independently of the other supporting members.

15 Claims, 6 Drawing Sheets

(51) Int. Cl.

| | |
|---|---|
| *B65B 65/00* | (2006.01) |
| *B65B 5/10* | (2006.01) |
| *B65G 47/26* | (2006.01) |
| *B65B 35/44* | (2006.01) |
| *B65B 57/14* | (2006.01) |
| *B65B 59/00* | (2006.01) |
| *B65B 65/02* | (2006.01) |
| *B65B 35/50* | (2006.01) |
| *B65B 59/02* | (2006.01) |

(52) U.S. Cl.
CPC ............ *B65B 57/14* (2013.01); *B65B 59/005* (2013.01); *B65B 65/02* (2013.01); *B65G 47/261* (2013.01); *B65G 47/845* (2013.01); *B65B 35/50* (2013.01); *B65B 59/02* (2013.01); *B65B 65/003* (2013.01); *B65B 2210/02* (2013.01); *B65B 2220/14* (2013.01); *B65B 2220/16* (2013.01); *B65B 2220/18* (2013.01)

(58) Field of Classification Search
CPC ....... B65B 59/005; B65B 35/50; B65B 59/02; B65B 65/003; B65B 2220/14; B65B 2220/16; B65B 2220/18; B65B 2210/02; B65G 47/26; B65G 47/261; B65G 47/265; B65G 47/844; B65G 47/845

USPC .............................................. 198/419.3, 619
See application file for complete search history.

(56) References Cited

U.S. PATENT DOCUMENTS

| | | | |
|---|---|---|---|
| 2003/0136086 A1* | 7/2003 | Kalany | B65B 35/24 53/443 |
| 2003/0230941 A1 | 12/2003 | Jacobs | |
| 2009/0283385 A1* | 11/2009 | Takayama | B65B 35/44 198/418.5 |
| 2009/0313955 A1 | 12/2009 | Gudim et al. | |
| 2010/0084247 A1* | 4/2010 | Wipf | B65G 19/02 198/617 |
| 2011/0056798 A1 | 3/2011 | Volk et al. | |
| 2012/0128460 A1 | 5/2012 | Webb | |
| 2013/0152516 A1* | 6/2013 | Sammons | B65B 9/087 53/562 |
| 2015/0158611 A1* | 6/2015 | Kalany | B65B 35/26 53/443 |

FOREIGN PATENT DOCUMENTS

| | | |
|---|---|---|
| EP | 1268317 B1 | 6/2004 |
| WO | 2013117310 A1 | 8/2013 |

* cited by examiner

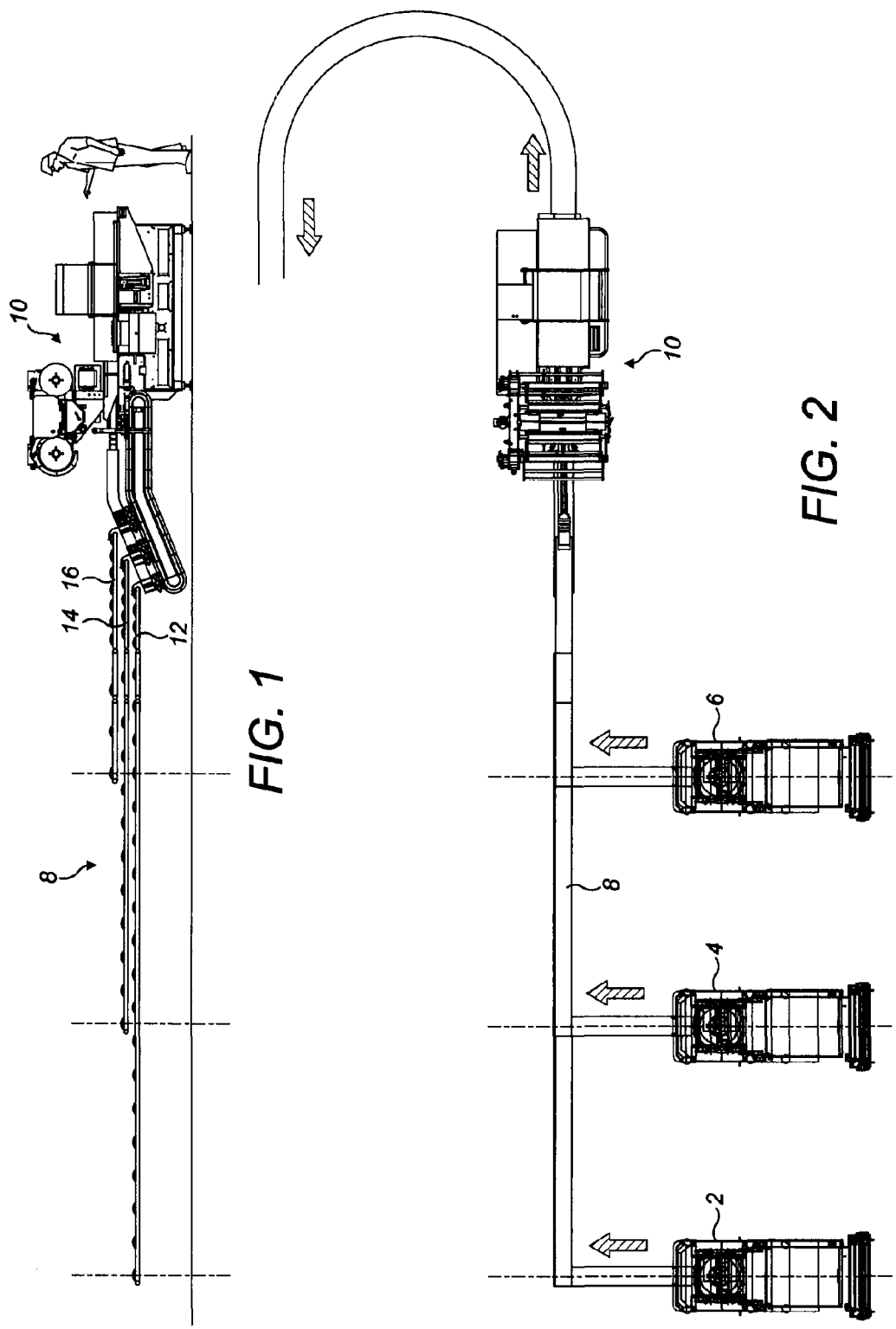

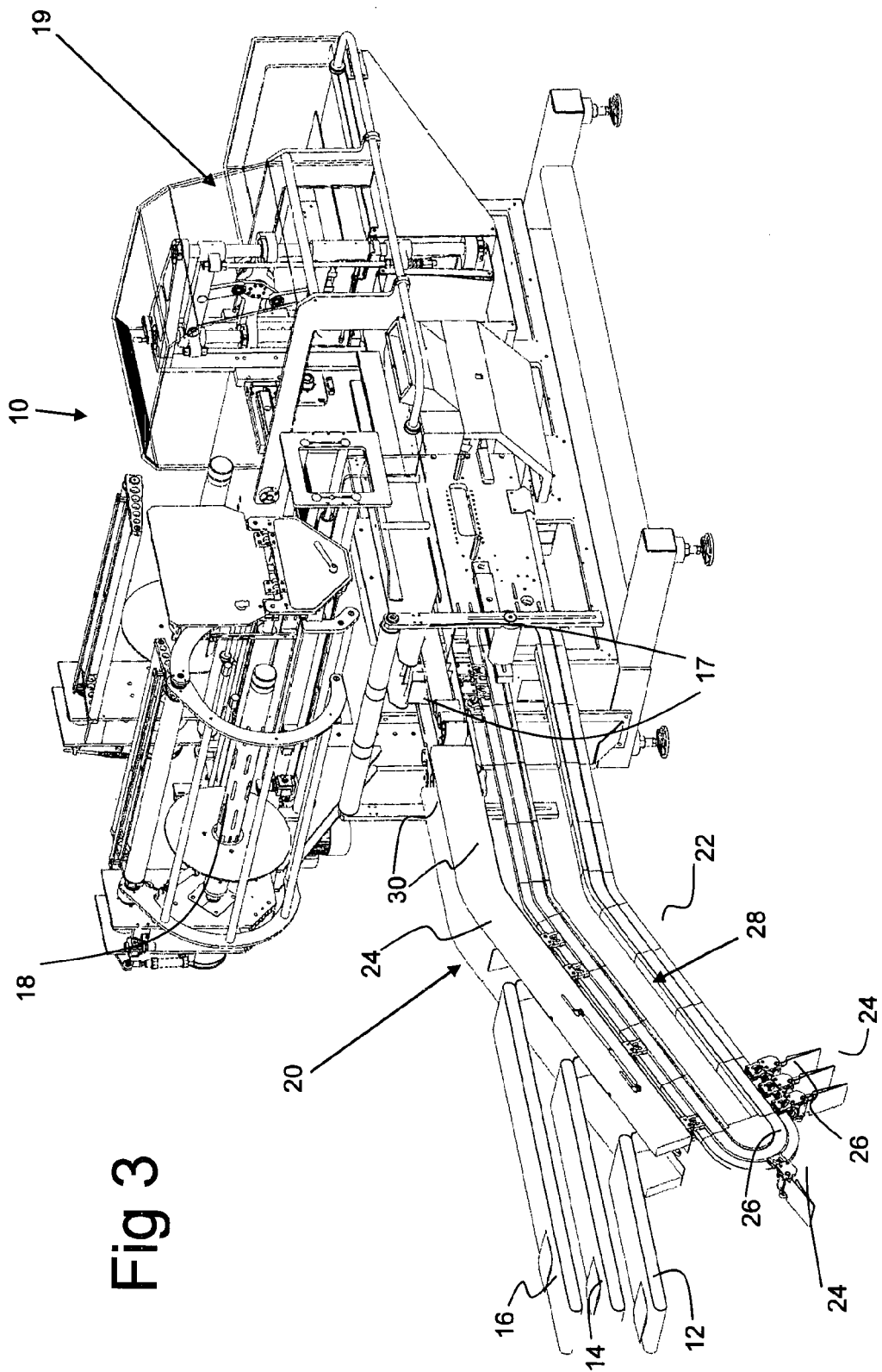

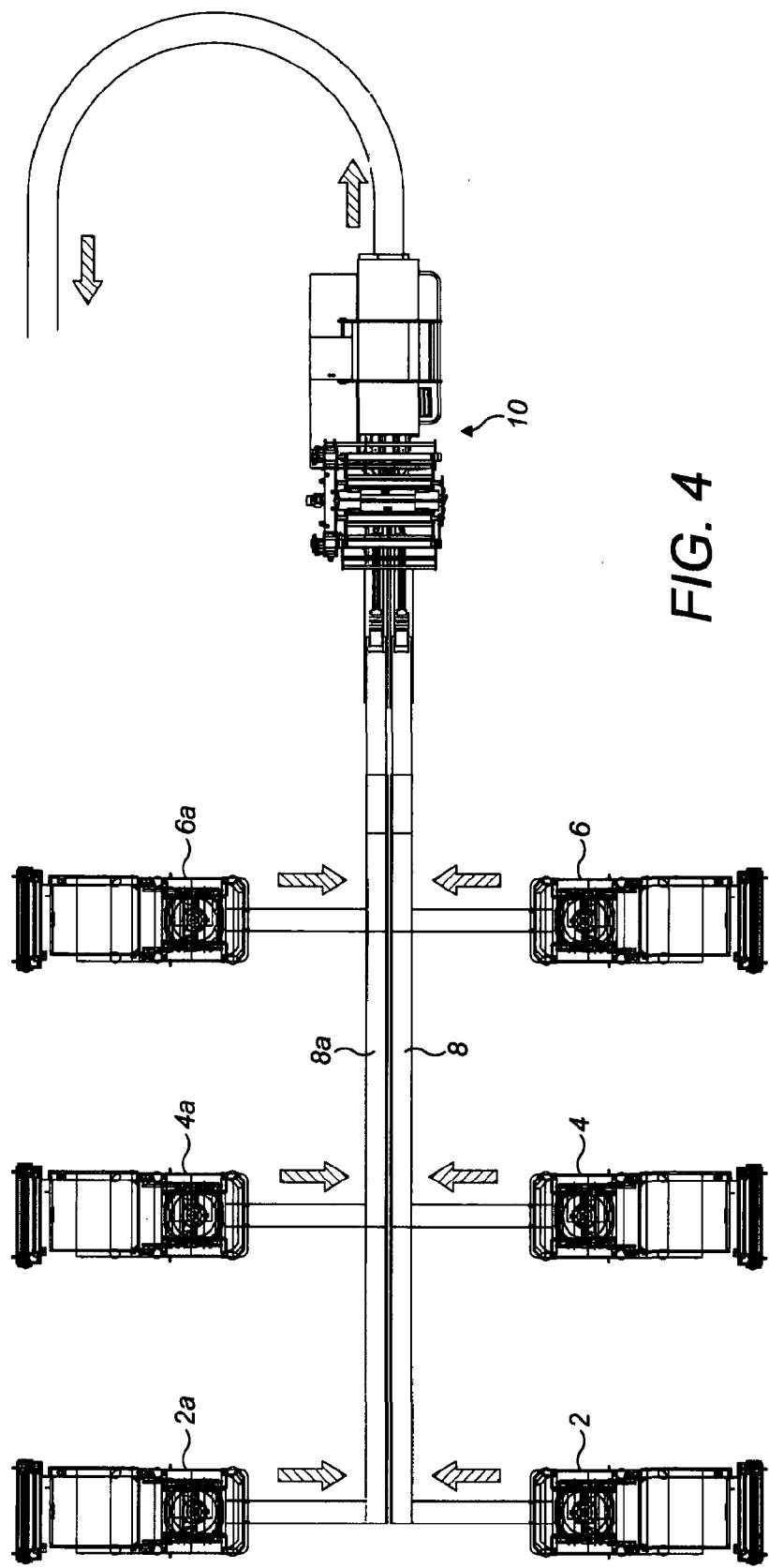

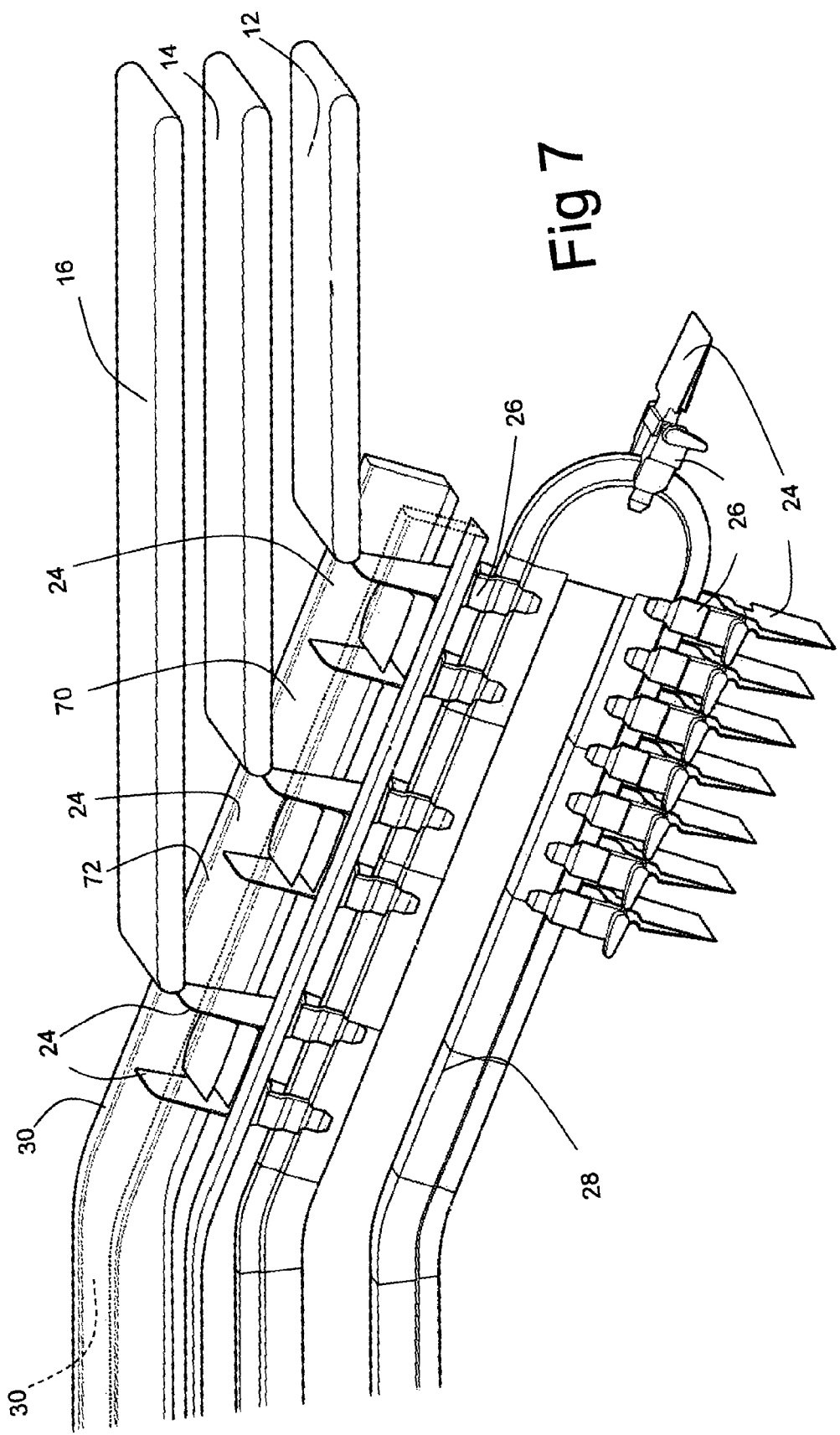

PRODUCT PACKAGING SYSTEM

RELATED APPLICATIONS

This application is a national phase application filed under 35 USC §371 of PCT Application No. PCT/GB2014/053207 with an International filing date of 29 Oct. 2014 which claims priority of GB Patent Application 13120685.9 filed 22 Nov. 2013. Each of these applications is herein incorporated by reference in their entirety for all purposes.

FIELD OF THE INVENTION

This invention relates to a product packaging system in which products from more than one packaging machine are delivered to a single packing location.

BACKGROUND TO THE INVENTION

Snack foods such as potato crisps (chips) are typically sealed into packets or bags straight after manufacture to preserve freshness. Different flavoured crisps will be manufactured and packaged on separate lines. It is then common practice to bring together a collation of packets of predetermined numbers of each flavour for overall packaging in a larger bag or packet. Alternatively, packets of the same-flavoured products may be collated in the same way, packets from multiple production lines being brought together in one final collation packaging line to ensure a sufficient delivery rate.

In a conventional collation packaging line, the packets are delivered from the individual product lines on to a common conveyor, from where packets are individually selected and lifted into the collation line by robotic devices. Because this selection and lifting operation is relatively slow, a number of robotic devices are needed, and a large amount of packing house space is required for the operation, and this increases costs.

There is therefore a need for a more compact and flexible collating and packaging system.

SUMMARY OF THE INVENTION

According to the invention, there is provided product packaging system, comprising a plurality of product sources, each delivering products to a packaging station via a respective conveying means, the packaging station comprising a collating conveyor which in turn delivers collations of products to a packaging line, the collating conveyor comprising an endless conveyor carrying a plurality of compartments, each compartment receiving from said conveying means products to be packaged, characterised in that the compartments are configured to enable their sizes to be changed, and the endless conveyor comprises a track arranged in a vertical loop and a plurality of product supporting members mounted for movement along the track, each supporting member being driven along the track and controllable independently of the other supporting members.

Preferably, the collation delivered to the packaging line comprises the contents of more than one compartment.

The compartments are configured to enable their sizes to be changed. This is achieved by using an endless conveyor comprising a track arranged in a vertical loop and a plurality of product supporting members mounted for movement along the track, each supporting member being driven along the track and controllable independently of the other supporting members. An example of a track and drive linear electric motor system of this type is the XTS linear transport system developed and sold by Beckhoff Automation GmbH.

Further features of the invention are set out in the claims.

The packaging system of the invention offers substantial flexibility of operation with precise control of the product mix when collating, and requires a considerably smaller amount of floor space compared with conventional packaging lines, saving capital and operating costs.

BRIEF DESCRIPTION OF THE DRAWINGS

In the drawings, which illustrate exemplary embodiments of the invention:

FIG. 1 is a diagrammatic side elevational view of a product packaging system;

FIG. 2 is a diagrammatic plan view of the system of FIG. 1;

FIG. 3 is a perspective view of a packaging machine forming part of the system of FIGS. 1 and 2;

FIG. 4 is diagrammatic plan view corresponding to that of FIG. 2, but showing how the system can be readily adapted to collate and package the output from a larger number of manufacturing machines;

FIG. 7 is a perspective view of an alternative collating conveyor configuration to that shown in FIG. 6.

DETAILED DESCRIPTION OF THE ILLUSTRATED EMBODIMENT

Figure 5:
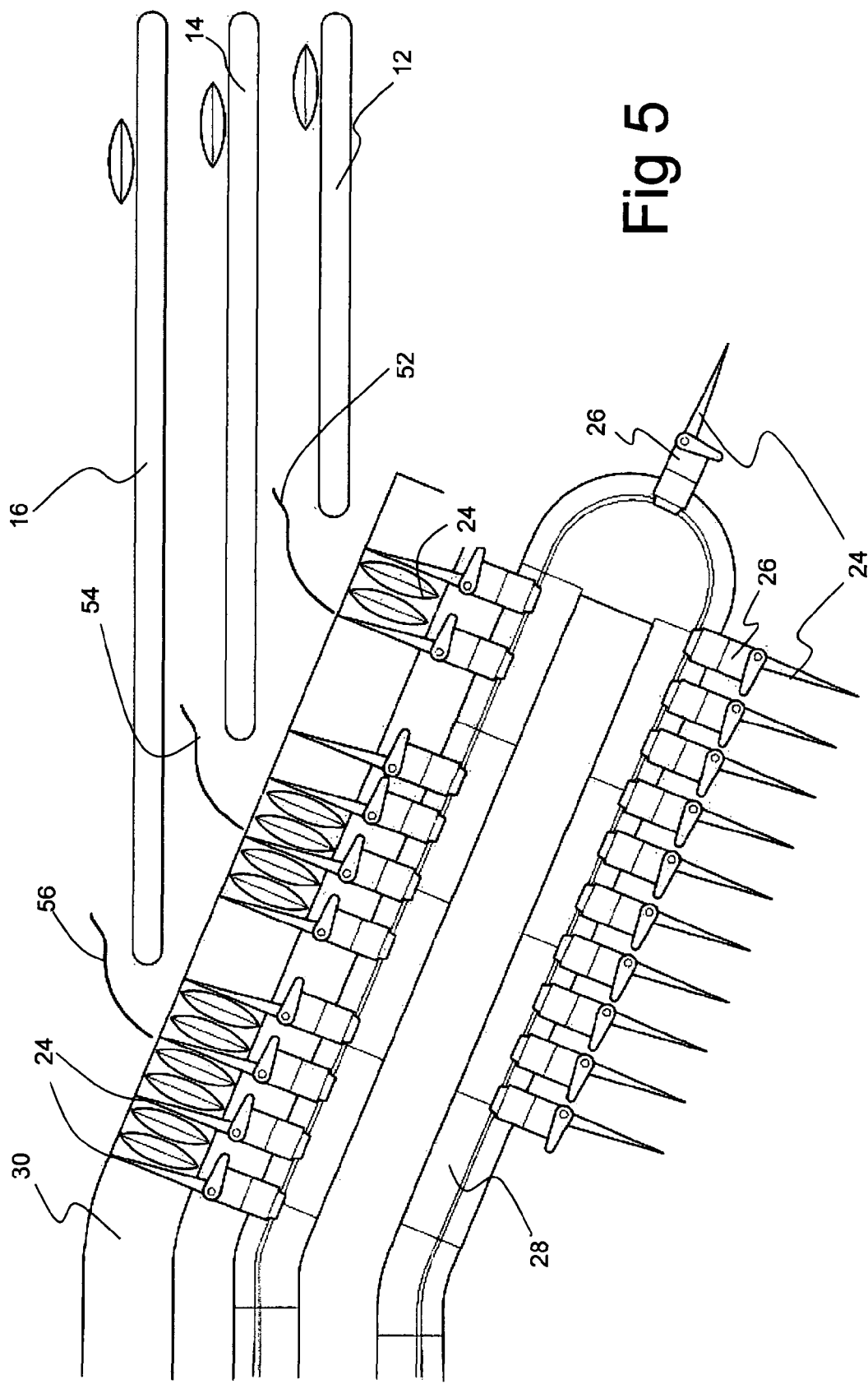
FIG. 5 is a side view of the collating conveyor configured to collate packets arranged vertically.

Referring to FIGS. 1 and 2, snacks are packed in single tube bagmaker machines 2, 4 and 6, which may be packing different types of snack, for example potato crisps of different flavours. Each machine 2-6 delivers its output, in the form of individual packets, to a respective belt of a three-tier conveyor 8 leading to a packaging machine 10, described hereinafter in more detail with reference to FIG. 3. Each belt 12, 14, 16 of the three-tier conveyor 8 is actually formed as a series of sequential belts, the drives of at least some of which can be speed controlled to vary the relative belt speeds so as to deliver the individual packages from the conveyor to the machine with a uniform gap and at the correct time to ensure the correct mix of products is delivered to the machine 10. The machine 10 forms predetermined collations of the packets and then forms a package or bag around the collation for sale as a "multipack", typically containing a predetermined selection of the different flavoured snacks, for example two each of three different flavours. It will be appreciated, however, that the system could equally be used to package a single type of product, where, for example, the output of a single bagmaker is not sufficient to supply the packaging machine. It will be further understood that the products could be manufactured at another location and transported in bulk to be held in a storage hopper or the like, from which they can be dispensed on to respective belts of the conveyor 8.

FIG. 3 shows a packaging machine 10 of the general type disclosed and claimed in our pending UK patent application GB1305273.3, but in which the collations are formed and delivered for bagging by direct delivery from the bagmakers instead of being selected and lifted into the collating channel by robotic arms. In the packaging machine 10, collations of packets are carried upright by parallel conveyor belts 17 gripping the sides of the packets, the belts extending into and through a wrapping station that feeds a web material from a reel 18 and forms it into a tube around the collations and the conveyors 17, a sealing and cutting station 19 being located to seal the tube and separate the resulting bags at the point where they emerge from between the conveyors.

The collations are formed in a collating stage 20 consisting of an endless track 22 arranged in a vertical loop and carrying a plurality of product supporting members 24, each in the general form of a rectangular blade, mounted on a carriage 26 which is driven along the track on the linear motor principle in a controllable manner, using a linear electric motor technology such as that sold under the trademark Beckhoff XTS® by Beckhoff Automation GmbH. Each carriage 26 can be positionally controlled along the track, speeding up or slowing down to vary the gap between adjacent. A portion 28 of the upper part of the track loop is arranged at an acute angle to the horizontal, typically from about 20° to about 45°, and suitably at 22.5°, and is positioned between walls 30 to define between adjacent pairs of the supporting members or blades 24 individually variable compartments for receiving the packets from the conveyor 8. The operation of the collating conveyor will be described hereinafter in more detail with reference to FIGS. 5 to 7.

In the embodiments illustrated in FIGS. 1 to 3, collations can be assembled from the output of three production machines, so where different-flavoured snack products are concerned a typical multipack might consist of two packets of each flavour. It will be appreciated that other combinations would also be possible, and that, as illustrated in FIG. 4, increasing the number of production machines feeding to the packaging line will enable different combinations of packets to be achieved, for example three each of six flavours for an 18-pack. Alternatively, where the production machines are all producing the same product, the multipacking operation can be accelerated still further. In the arrangement illustrated in FIG. 4, the bagmaker machines 2, 4 and 6 feeding via conveyor 8 to the packaging machine 10 are duplicated with machines 2a, 4a and 6a feeding via a second conveyor 8a the same packaging machine 10.

It will be appreciated that while the specific embodiments relate to the formation of multipacks consisting of a bag containing a collation of packets, the packaging machine 10 could be replaced with a simple box packing stage, where the desired number of packets is counted into each box, in the desired combination of different products (for example different-flavoured snacks), or of a single type of product.

Referring now to FIG. 5, each belt 12, 14, 16 delivers packets to the angled portion 28 of the track of the collating conveyor successively. In this configuration, the collations are formed with the packets arranged essentially vertically, the end of each belt 12, 14, 16 being provided with a curved guide plate 52, 54, 56 arranged to guide the packet around the end of the conveyor so as to drop upright into the compartment formed between two adjacent blades 24. The collation is formed progressively as follows:

The blades 24 are arranged to travel in pairs at this stage of the machine. The first pair arrives at the gap defined between the lowermost part of the guide 52 and the end of the belt 12, spaced apart sufficiently to receive a single packet and hold it generally upright.

The lower of the pair of blades 24 then reverses to widen the compartment between the pair just sufficiently to receive another packet, which is then dropped in by the conveyor 12. The controller for the system is configured to control the arrival of the packets on the belts 12, 14, 16 (by selectively varying the speeds of the sequential sections of belt) to co-ordinate with the movement of the blades.

Another two blades 24 are then moved round to follow the lowermost pair and to define two more compartments following on from the first, which now contains two packets. The resulting four blades move upward along the angled portion 28 of the track so that the empty compartment behind the uppermost of the three is now aligned with the space between the lowermost part of the guide 54 and the end of the middle belt 14.

This compartment is then filled with two packets in the same manner as the first.

The set of four blades 24 now moves upwardly so that the empty third compartment is aligned with the space between the lowermost edge of the guide 56 and the end of the upper belt 16.

A further two packets are delivered into the compartment in the same manner as for the other two, and the collation of six packets can then move on to the packaging section.

It will be understood that the collating conveyor can readily be adapted to collate the products in different combinations, with more or fewer products from each belt in each collation, by changing the delivery rates and the movements of the blades 24, for example receiving three packets in each compartment instead of two.

Figure 6:
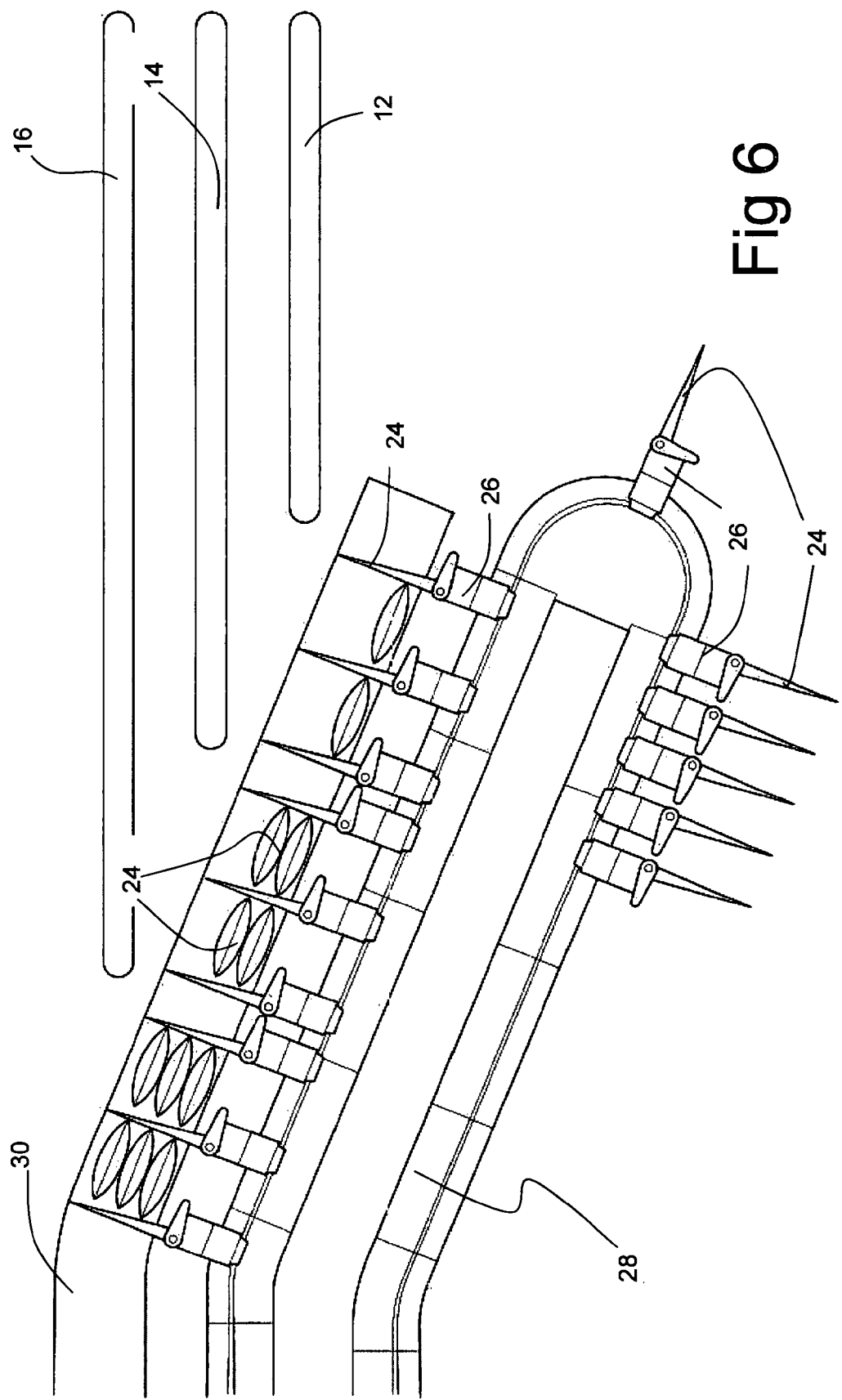
FIG. 6 is a similar view to that of FIG. 5, but with the collating conveyor configured to stack horizontally aligned packets.

While collating the packets in a generally upright configuration as shown in FIG. 5 may be desirable for some product presentation, in others it may be desired to stack the packets vertically one upon another so that each packet extends generally parallel to the direction of travel into the packaging machine. FIG. 6 illustrates the collating conveyor configured to collate the packets in this way. The guide plates 52, 54, 56 are suitably mounted on actuators (not shown) so as to be selectively movable to a position where they no longer influence the paths of the packets, thereby allowing them to fall into the compartments with their longer axes essentially parallel to the track, whereby stacks of, say, three packets may be formed. FIG. 6 thus does not show the guides 52, 54, 56, but it will be appreciated that they could be present but simply rotated to an inoperative position away from the conveying means supplying the packets. An adjustment of the movement of the blades 24 is also required so as to move in spaced groups of three to form between them two compartments of sufficient width to accommodate the packets in the other orientation. In this configuration, the widths of the compartments can remain fixed, with the blades 24 moving so that one packet from each of the belts 12, 14, 16 is deposited in each compartment successively, the compartments moving between each deposit. It will be seen that the filled compartments in a collation are separated from the next collation by an empty compartment.

An alternative arrangement of the collating conveyor is shown in FIG. 7 using fewer of the blades 24 and permitting collations of, say, three each of three types or flavours of products. For the lower belt 12 and the middle belt 14, a vertically hinged flap 70, 72 is mounted in one of the walls 30 and provided with drive means to rotate the flap 70, 72 between a rest position, in which it is flush with the wall 30, and an operative position in which it extends across the space between the walls to define temporarily with one of the blades 24 a compartment into which the packets may be received. The sequence of operations in forming a collation is thus:

A spaced pair of blades 24 forming a first compartment travels to a position in which the lower of the blades is aligned with the end of the upper belt 16;

Third and fourth blades also move around the track to align with the ends of the middle 14 and lower 12 belts;

The blades rest temporarily in these positions, and the flaps 72 and 70 rotate to their operative positions spaced from the middle and lower blades 24 respectively by a distance sufficient to accommodate the packets extending essentially horizontally relative to the direction of travel of the packets.

The belts 12, 14 and 16 deliver the required number of packets into the compartments, for example three to each compartment to achieve a collation of nine. The flaps 70, 72 then retract to their rest positions and the lower and middle blades 24 are advanced to close the space with the upper pair so that the collation is contained by just four blades as it is moved on into the packaging stage, and the next set of blades 24 is moved into position.

The packaging system of the invention permits considerable flexibility in packaging collations of products. For example, by controlling the guide plates 52, 54, 56 dynamically it is possible to configure the collations with combinations of upright and stacked packets, for example with two stacks of three packets with one upright packet between them, allowing the collating of odd numbers of packets as well as even numbers. It is also possible to configure the collator to operate with multiple parallel lanes feeding into a single bagging station to enable the bagging of larger collations. This can be achieved by having split blades operating in the parallel lanes and driven from a single track.

Where the packets are collated in stacks, for example to be bagged as two stacks of three packets, the blade propelling the second stack may be operated to "nudge" the second stack towards the first stack ahead of it as the film is formed around the collation into a bag, the first stack being constrained from movement by the closed end of the bag ahead of it. In this way, a small degree of interlacing is achieved between the packets. This is applicable to loose packets of the type containing snack products, where the edges of the packets are thinner than the centre portion. The interlacing reduces the volume of the completed bag or multipack without adversely affecting the content of the individual packets, thereby achieving substantial cost savings, both in reducing the packaging material used for the multipack and in permitting a greater number of the multipacks to occupy the same volume, reducing transport and storage costs and permitting a more efficient use of shop display space. For other types of products where interlacing is not possible, or is undesirable, the "nudge" operation serves simply to eliminate unnecessary space between stacks.

The packaging system of the invention offers the ability not only to collate different product varieties, but also to regulate delivery of identical products provided from multiple sources to accommodate variations in rates of supply from the different sources, thereby delivering collations to the bagging station at a constant rate to match the bagging film speed, thereby avoiding the need to vary the speed. The flows of products in the different conveying means can be detected and the blades of the collating conveyor individually controlled to ensure the constant delivery rate of the collations to the bagging station. This simplifies construction and operation of the bagging station.

While the invention has been illustrated with the products being delivered along the axis of movement of the collating conveyor, it will be appreciated that delivery could also be into the compartments transversely of the direction of travel, the collating conveyor extending generally horizontally at the point of delivery, and being configured so that the compartments may receive product individually from a respective one of the belts or some product from each of the belts in turn, according to the requirements for the collation to be packaged in the bagging station or packaging line.

While the system of the invention has been particularly described with reference to packets of snack foods, it will be appreciated that it could be applied to the packaging of a wide range of different products.

The invention claimed is:

1. A product packaging system, comprising a plurality of product sources, each delivering products to a packaging station via a respective conveying means, the packaging station comprising a collating conveyor which in turn delivers collations of products to a packaging line, the collating conveyor comprising an endless conveyor carrying a plurality of compartments, each compartment receiving from said conveying means products to be packaged, characterised in that the compartments are configured to enable their sizes to be changed, and the endless conveyor comprises a track arranged in a vertical loop and a plurality of product supporting members mounted for movement along the track, wherein said track forms with each product supporting member a linear motor, each supporting member being driven along the track and controllable independently of the other supporting members wherein said compartments are defined by spaces between adjacent said product supporting members.

2. The product packaging system of claim 1, wherein the collation delivered to the packaging line comprises the contents of more than one compartment.

3. The product packaging system of claim 1, wherein the track forms with each product supporting member a linear electric motor.

4. The product packaging system of claim 1, wherein the collating conveyor is configured to align the products with respect to each other within a collation.

5. The product packaging system of claim 4, wherein at least a portion of the upper part of the track extends at an acute angle to the horizontal.

6. The product packaging system of claim 5, wherein the acute angle is 20° to 45°.

7. The product packaging system of claim 5, wherein the acute angle is 22.5°.

8. The product packaging machine of claims 5, further comprising a guide plate associated with each conveying means and located above the collating conveyor, configured to guide the products from the conveying means and into a compartment of the collating conveyor in an upright orientation generally normal to the track, the guide plate being removable.

9. The product packaging machine of claim 8, wherein each guide plate is carried by actuating means operable to move the guide plate between an operative position, in which it serves to guide the products, and a removed position out of contact with the products, whereby the products fall into the compartments so as to extend generally parallel to the track.

10. The product packaging system claim 1, wherein the product sources are product manufacturing machines.

11. The product packaging system of claim 1, wherein the product sources are product storage hoppers.

12. The product packaging system of claim 1, wherein each conveying means comprises a plurality of successive conveying stages, each stage having variable-speed drive.

13. The product packaging system of claim 12, further comprising a detector for detecting the arrival of products on each conveying means at the packaging station, and control means connected to the detectors and to means for driving the conveying means and configured to vary the speeds of the stages whereby to achieve delivery of packages on each conveying means to the packaging station with a predetermined spacing therebetween.

14. The product packaging system of claim 1, wherein the conveying means are arranged to deliver products into the collating conveyor along an axis extending in the plane of the collating conveyor loop.

15. The product packaging system of claim 1, wherein the conveying means are arranged to deliver products into the conveyor along axes extending transversely to the plane of the collating loop.

\* \* \* \* \*